(12) United States Patent
Kwak et al.

(10) Patent No.: US 10,457,834 B2
(45) Date of Patent: Oct. 29, 2019

(54) CHROME FREE COATING COMPOSITION HAVING EXCELLENT BLACKENING RESISTANCE AND CORROSION RESISTANCE, AND SURFACE-TREATED STEEL SHEET

(71) Applicants: POSCO, Pohang-si, Gyeongsangbuk-do (KR); NOROO COIL COATINGS CO., LTD., Pohang-si, Gyeongsangbuk-do (KR)

(72) Inventors: Young-Jin Kwak, Gwangyang-si (KR); Tae-Yeob Kim, Gwangyang-si (KR); Dong-Yun Kim, Anyang-si (KR); Yong-Jin Cho, Anyang-si (KR); Myoung-Hee Choi, Anyang-si (KR)

(73) Assignees: POSCO, Pohang-si, Gyeongsangbuk-do (KR); NOROO Coil Coatings Co., Ltd., Pohang-si, Gyeongsangbuk-do (KR)

( * ) Notice: Subject to any disclaimer, the term of this patent is extended or adjusted under 35 U.S.C. 154(b) by 15 days.

(21) Appl. No.: 15/539,652

(22) PCT Filed: Dec. 22, 2015

(86) PCT No.: PCT/KR2015/014086
§ 371 (c)(1),
(2) Date: Jun. 23, 2017

(87) PCT Pub. No.: WO2016/105078
PCT Pub. Date: Jun. 30, 2016

(65) Prior Publication Data
US 2017/0369735 A1 Dec. 28, 2017

(30) Foreign Application Priority Data

Dec. 26, 2014 (KR) .................... 10-2014-0190170

(51) Int. Cl.
| | | |
|---|---|---|
| *C09D 175/04* | (2006.01) | |
| *C09D 5/08* | (2006.01) | |
| *C08G 18/50* | (2006.01) | |
| *B32B 15/095* | (2006.01) | |
| *C08G 18/75* | (2006.01) | |
| *C08G 18/08* | (2006.01) | |
| *C08G 18/10* | (2006.01) | |
| *C09D 175/06* | (2006.01) | |
| *C08G 18/34* | (2006.01) | |
| *C08G 18/44* | (2006.01) | |
| *C23C 22/74* | (2006.01) | |
| *C09D 7/40* | (2018.01) | |
| *C09D 7/65* | (2018.01) | |

(52) U.S. Cl.
CPC .......... *C09D 175/04* (2013.01); *B32B 15/095* (2013.01); *C08G 18/0823* (2013.01); *C08G 18/10* (2013.01); *C08G 18/348* (2013.01); *C08G 18/44* (2013.01); *C08G 18/5096* (2013.01); *C08G 18/755* (2013.01); *C09D 5/08* (2013.01); *C09D 5/084* (2013.01); *C09D 7/40* (2018.01); *C09D 7/65* (2018.01); *C09D 175/06* (2013.01); *C23C 22/74* (2013.01); *B32B 2255/06* (2013.01); *C23C 2222/20* (2013.01)

(58) Field of Classification Search
CPC .. C08G 18/10; C08G 18/348; C08G 18/3206; C08G 18/3231; C08G 18/3893; C08G 18/0823; C08G 18/44; C08G 18/5096; C08G 18/755; B32B 15/095; B32B 2255/06; C09D 175/04; C09D 175/06; C09D 5/08; C09D 5/084; C09D 7/40; C09D 7/65; C23C 2222/20; C23C 22/74
USPC .............................. 428/425.8; 525/453, 457
See application file for complete search history.

(56) References Cited

U.S. PATENT DOCUMENTS

| | | | | |
|---|---|---|---|---|
| 6,440,541 B1* | 8/2002 | Humphrey | ............. | B05D 5/068 |
| | | | | 427/250 |
| 7,754,799 B2 | 7/2010 | Araki et al. | | |
| 2007/0129527 A1* | 6/2007 | Griswold | ................ | C08G 18/10 |
| | | | | 528/64 |
| 2012/0114957 A1* | 5/2012 | Fujibayashi | ........... | C09D 5/024 |
| | | | | 428/457 |

(Continued)

FOREIGN PATENT DOCUMENTS

| | | | |
|---|---|---|---|
| CN | 101326308 A | 12/2008 | |
| CN | 102260450 A | 11/2011 | |

(Continued)

OTHER PUBLICATIONS

Extended European Search Report dated Dec. 1, 2017 issued in European Application No. 15873605.8.

(Continued)

*Primary Examiner* — Thao T Tran
(74) *Attorney, Agent, or Firm* — Morgan, Lewis & Bockius LLP

(57) ABSTRACT

The present invention provides a chromium-free coating composition having high blackening resistance and corrosion resistance, the composition comprising: 20 to 70 wt % of waterborne silane modified polyurethane; 0.5 to 5 wt % of a hardener; 0.5 to 5 wt % of a blackening inhibitor; 0.5 to 5 wt % of a corrosion inhibitor; and 0.5 to 5 wt % of a lubricant, with the balance being a solvent. The chromium-free coating composition has the effect of improving blackening resistance, corrosion resistance, alkali resistance, solvent resistance and fingerprint resistance of a steel sheet on which a coating layer comprising the composition is formed.

10 Claims, No Drawings

(56) References Cited

U.S. PATENT DOCUMENTS

2013/0281562 A1* 10/2013 Burckhardt ............ C07F 7/1804
  521/154
2016/0068704 A1* 3/2016 Ma ........................ B32B 15/095
  428/626
2016/0264710 A1* 9/2016 Eling ................. C08G 18/3893

FOREIGN PATENT DOCUMENTS

| CN | 103694849 A | 4/2014 |
| EP | 1433827 A1 | 6/2004 |
| EP | 1798248 A1 | 6/2007 |
| EP | 2754694 A1 | 7/2014 |
| JP | H08-337765 A | 12/1996 |
| JP | H09-241828 A | 9/1997 |
| JP | 55-55177 B2 | 7/2014 |
| KR | 2006-0076953 A | 7/2006 |
| KR | 10-2008-0050525 A | 6/2008 |
| KR | 10-2009-0017868 A | 2/2009 |
| KR | 10-2009-0046262 A | 5/2009 |
| KR | 10-2011-0077698 A | 7/2011 |
| KR | 10-2012-0097728 A | 9/2012 |
| KR | 2012128771 A * 11/2012 ........... C09D 133/04 |
| KR | 10-2014-0081574 A | 7/2014 |
| KR | 10-2014-0083802 A | 7/2014 |
| WO | 2007/069783 A1 | 6/2007 |

OTHER PUBLICATIONS

International Search Report dated Apr. 1, 2016 issued in International Patent Application No. PCT/KR2015/014086 (with English translation).

Chinese Office Action dated Oct. 9, 2018 in corresponding Chinese Application No. 201580071194.7.

* cited by examiner

CHROME FREE COATING COMPOSITION HAVING EXCELLENT BLACKENING RESISTANCE AND CORROSION RESISTANCE, AND SURFACE-TREATED STEEL SHEET

CROSS REFERENCE

This patent application is the U.S. National Phase under 35 U.S.C. § 371 of International Application No. PCT/KR2015/014086, filed on Dec. 22, 2015, which claims the benefit of Korean Patent Application No. 10-2014-0190170, filed on Dec. 26, 2014, the entire contents of each are hereby incorporated by reference.

TECHNICAL FIELD

The present disclosure relates to a chromium-free coating composition having high blackening resistance and corrosion resistance, and a surface-treated steel sheet.

BACKGROUND ART

Magnesium sheets and steel sheets plated with a magnesium alloy such as Zn—Al—Mg, Zn—Al—Mg—Si, Zn—Mg, Mg/Zn, Al—Mg, or Al—Mg—Si have high corrosion resistance, but are easily blackened on the surface thereof by oxygen and moisture contained in air while being transported or when in storage.

Such blackening occurs because magnesium and zinc contained in the surface of a plated steel sheet containing magnesium is converted into composite hydroxides or oxides by contact with moisture. Blackening deteriorates the appearance of products and significantly facilitates cracking in machined portions because of a hardness difference between magnesium and zinc, thereby lowering workability.

To address these problems, methods of forming an oil coating, an anodic coating, or an organic coating on a magnesium steel sheet or a magnesium alloy plated steel sheet have been widely used. However, the oiling method is not suitable to improve the blackening resistance of such steel sheets in the case of storing the steel sheets for a long period of time. In addition, the method of forming an anodic coating makes it difficult to guarantee safety because of the use of large amounts of strong inorganic acids, hazardous to the environment and human health, and is not suitable for continuous production lines because of complex and time-consuming processes. The method of forming an organic coating requires a high-temperature condition for forming an organic coating and a long process time for drying the organic coating.

As a surface treatment technique, Korean Patent Application Laid-open Publication No. 2009-0017868 an anodic coating treatment method including ten steps for the surface treatment of a magnesium alloy product. However, the method disclosed in the patent document is a surface treatment method for a part but not for a steel sheet, and is uneconomical because of many process steps and long process times. U.S. Pat. No. 7,754,799 discloses a method of improving the chemical resistance of a magnesium alloy steel sheet using zinc oxide treated with an organic polysiloxane, a non-reactive silicone oil, and silane. However, this method also requires a long drying time even though the process temperature of drying is low, and organic polysiloxane and silicone oil decrease the adhesion of a top coat of paint. Thus, if this method is applied to magnesium steel sheets or alloy steel sheets, it is difficult to use the steel sheets in various applications. Japanese Patent Application Laid-open Publication No. H9-241828 discloses a technique for preventing blackening in a surface region of a Zn—Mg plating layer by dipping the Zn—Mg plating layer into a phosphoric acid pickling bath containing phosphoric acid in an amount of 0.01 wt % to 30 wt % to reduce the content of magnesium in the surface region of the Zn—Mg plating layer. However, the luster and appearance of Zn—Mg plated steel sheets deteriorate as a result of a pickling process, and sludge may have to be removed from a picked region.

DISCLOSURE

Technical Problem

Aspects of the present disclosure may provide a chromium-free coating composition for improving blackening resistance, corrosion resistance, and workability of a magnesium-containing steel sheet without using a strong oxidizer such as a fluorine compound and a heavy metal such as chromium, and a steel sheet including a coating layer formed of the chromium-free coating composition.

Technical Solution

According to an aspect of the present disclosure, a chromium-free coating composition may have high blackening resistance and corrosion resistance, and may include waterborne silane-modified polyurethane in an amount of 20 wt % to 70 wt %, a hardener in an amount of 0.5 wt % to 5 wt %, a blackening inhibitor in an amount of 0.5 wt % to 5 wt %, a corrosion inhibitor in an amount of 0.5 wt % to 5 wt %, a lubricant in an amount of 0.5 wt % to 5 wt %, and a balance of a solvent.

The waterborne silane-modified polyurethane may have a number average molecular weight within a range of 10,000 to 60,000.

The waterborne silane-modified polyurethane may include organosilane in an amount of 1 wt % to 5 wt % based on a total weight of the waterborne silane-modified polyurethane.

The organosilane may be a compound having the following chemical formula:

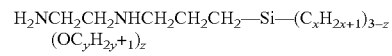

where x is an integer ranging from 1 to 2, and y and z are integers ranging from 1 to 3.

The organosilane may include at least one selected from N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, and N-(2-aminoethyl)-3-aminopropyltripropoxysilane.

The hardener may be at least one selected from 3-glycidoxypropyltrimethoxysilane, 3-glycidoxypropyltriethoxysilane, 3-glycidoxypropyltripropylsilane, 3-glycidoxypropyltriisopropylsilane, 2-(3,4-epoxycyclohexyl)ethyltrimethoxysilane, and 2-(3,4-epoxycyclohexyl)ethyltriethoxysilane.

The blackening inhibitor may include at least one selected from a nickel compound, a vanadium-based compound, a zirconium-based compound, a cerium-based compound, and a molybdenum-based compound.

The corrosion inhibitor may include at least one selected from lithium silicate, sodium silicate, and potassium silicate.

The corrosion inhibitor may have a metal content of 0.1 wt % to 2 wt % based on a total weight of the corrosion inhibitor.

According to another aspect of the present disclosure, a surface-treated steel sheet having high blackening resistance and corrosion resistance may include: a magnesium-containing steel sheet; and a coating layer formed on at least one side of the magnesium-containing steel sheet, wherein the coating layer is a cured product of the chromium-free coating composition.

The coating layer has a dry weight of 300 mg/m$^2$ to 1200 mg/m$^2$.

The chromium-free coating composition may be cured at a temperature of 70° C. to 180° C.

Advantageous Effects

According to the present disclosure, the chromium-free coating composition improves blackening resistance, corrosion resistance, alkali resistance, solvent resistance, and fingerprint resistance of a steel sheet having a coating layer including the chromium-free coating composition.

BEST MODE

Exemplary embodiments of the present disclosure will now be described in detail. The disclosure may, however, be exemplified in many different forms and should not be construed as being limited to the specific embodiments set forth herein.

An embodiment of the present disclosure relates to a chromium-free coating composition having high blackening resistance and corrosion resistance. In detail, the chromium-free coating composition may include waterborne silane-modified polyurethane in an amount of 20 wt % to 70 wt %, a hardener in an amount of 0.5 wt % to 5 wt %, a blackening inhibitor in an amount of 0.5 wt % to 5 wt %, a corrosion inhibitor in an amount of 0.5 wt % to 5 wt %, a lubricant in an amount of 0.5 wt % to 5 wt %, and the balance of a solvent.

The waterborne silane-modified polyurethane is a waterborne polyurethane that may include organosilane as a chain extender. Preferably, the waterborne silane-modified polyurethane may have a number average molecular weight of 10,000 to 60,000. If the number average molecular weight of the waterborne silane-modified polyurethane is lower than 10,000, the waterborne silane-modified polyurethane may be easily separated after a drying process or may be dissolved because of an excessively low molecular weight, and is thus not suitable as a coating material. Conversely, if the number average molecular weight of the waterborne silane-modified polyurethane is greater than 60,000, although the waterborne silane-modified polyurethane is prepared, it may be difficult to uniformly form a coating layer using the waterborne silane-modified polyurethane because of excessively large particles of the waterborne silane-modified polyurethane.

Preferably, the content of the waterborne silane-modified polyurethane may be within the range of 20 wt % to 70 wt %. If the content of the waterborne silane-modified polyurethane is lower than 20 wt %, permeation of external corrosion factors into a surface of a plated steel sheet is not sufficiently prevented, and the corrosion resistance and adhesion of the waterborne silane-modified polyurethane are low. Conversely, if the content of the waterborne silane-modified polyurethane is greater than 70%, the contents of the hardener, the blackening inhibitor, the corrosion inhibitor, and the lubricant are relatively low, and thus it may be difficult to obtain intended multiple functions.

When the waterborne silane-modified polyurethane is prepared, a waterborne polyurethane not including modified silane may be prepared using a general method. For example, the waterborne polyurethane may be prepared using a polyol such as non-yellowing polycarbonate diol or polyester diol, dimethylol propionic acid, non-yellowing isocyanate monomer, organic amine for neutralization, and water.

Organosilane for modifying the waterborne polyurethane may be used in a chain extending process, and the type of the organosilane is not particularly limited as long as the organosilane has an amino group for chain extension. For example, the organosilane may have the following chemical formula:

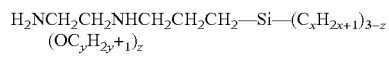

(where x is an integer ranging from 1 to 2, and y and z are integers ranging from 1 to 3)

The organosilane may include at least one selected from the group consisting of N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, and N-(2-aminoethyl)-3-aminopropyltripropoxysilane.

Preferably, the waterborne silane-modified polyurethane may include the organosilane in an amount of 1 wt % to 5 wt % based on the total weight of the waterborne silane-modified polyurethane. If the content of the organosilane is lower than 1 wt %, the molecular weight of the waterborne silane-modified polyurethane may not be sufficiently increased, and the organosilane may not have a sufficient internal crosslinking ability, thereby decreasing the adhesion and corrosion resistance of the chromium-free coating composition. However, if the content of the organosilane is greater than 5 wt %, waterborne urethane particles may be excessively large, or the viscosity of the waterborne silane-modified polyurethane may increase. Thus, it may be difficult to use the chromium-free coating composition as a coating resin.

The hardener of the chromium-free coating composition may improve the adhesion and crosslinking between the waterborne silane-modified polyurethane and a steel sheet containing magnesium. The hardener may directly crosslink with a silanol group being a hydrolysis product of the organosilane or a urethane group or carboxyl group of the waterborne polyurethane. In addition, the hardener may induce a covalent bond through direct reaction with a polar group of a steel sheet containing magnesium.

The hardener may include at least one selected from the group consisting of 3-glycidoxypropyltrimethoxysilane, 3-glycidoxypropyltriethoxysilane, 3-glycidoxypropyltripropylsilane, 3-glycidoxypropyltriisopropylsilane, 2-(3,4-epoxycyclohexyl)ethyltrimethoxysilane, and 2-(3,4-epoxycyclohexyl)ethyltriethoxysilane.

Preferably, the chromium-free coating composition may include the hardener in an amount of 0.5 wt % to 5 wt %. If the content of the hardener is lower than 0.5 wt %, crosslinking density may decrease, and thus, physical properties such as corrosion resistance, solvent resistance, and alkali resistance may decrease. If the content of the hardener is greater than 5 wt %, some of the hardener remaining after reaction may decrease corrosion resistance and increase the viscosity of the waterborne silane-modified polyurethane, thereby lowering solution stability.

If moisture permeates into a coating layer of a magnesium-containing steel sheet, a rapid increase in pH value may be caused because of a high oxidation rate of magnesium. As a result, a strong alkaline plating layer may be formed at an interface with the coating layer, facilitating discoloration of the plating layer and hydrolysis of a resin. The blackening inhibitor of the chromium-free coating composition may prevent a rapid increase in pH value and thus discoloration when moisture permeates into a coating layer.

The blackening inhibitor may include at least one selected from the group consisting of a nickel compound, a vanadium-based compound, a zirconium-based compound, a cerium-based compound, and a molybdenum-based compound, and each of the listed metal compound may include at least one selected from the group consisting of a chloride, a nitrogen oxide, a sulfur oxide, and an ammonium salt.

Preferably, the content of the blackening inhibitor in the chromium-free coating composition may be 0.5 wt % to 5 wt %. If the content of the blackening inhibitor is lower than 0.5 wt %, blackening may not be prevented in a corrosion resistance test or isothermal-isohumidity test. If the content of the blackening inhibitor is greater than 5 wt %, the amounts of oxidizing materials may be excessive. In this case, discoloration of magnesium included in a plating material may be facilitated, and blackening resistance and corrosion resistance may decrease.

The corrosion inhibitor of the chromium-free coating composition may include a silicate material combined with a metal. The metal combined with the silicate material may help silicate to dissolve rapidly and easily form a complex compound with magnesium ions or zinc ions included in a plating layer. In this manner, the corrosion inhibitor may guarantee corrosion resistance by suppressing additional elution of magnesium or zinc.

The corrosion inhibitor may include any silicate material combined with a metal. For example, the corrosion inhibitor may include at least one selected from the group consisting of lithium silicate, sodium silicate, and potassium silicate.

The content of the corrosion inhibitor in the chromium-free coating composition may preferably be within the range of 0.5 wt % to 5 wt %. If the content of the corrosion inhibitor is 0.5 wt %, corrosion resistance may be insufficient. If the content of the corrosion inhibitor is greater than 5 wt %, it may be difficult to form a coating layer because of some of the corrosion inhibitor remaining after reaction, and due to low water resistance, corrosion resistance and coatability may decrease.

The corrosion inhibitor may have a metal content of 0.1 wt % to 2 wt % based on the total weight of the chromium-free coating composition. If the metal content is lower than 0.1 wt %, silicate dissolution may occur slowly, and thus effective corrosion resistance may not be obtained. If the metal content is greater than 2 wt %, a coating layer may be wet because of deliquescence caused by excessively rapid dissolution, and thus, corrosion resistance and alkali resistance may decrease.

The lubricant of the chromium-free coating composition does not deteriorate the lubrication characteristics of the chromium-free coating composition, and examples of the lubricant may include a polyethylene-based lubricant, a tetrafluoroethylene-based lubricant, a product in which polyethylene and tetrafluoroethylene are chemically combined, a polyamide-based lubricant, a polypropylene-based lubricant, and a polysiloxane-based lubricant.

The content of the lubricant in the chromium-free coating composition may preferably be within the range of 0.5 wt % to 5 wt %. If the content of the corrosion inhibitor is 0.5 wt %, sufficient lubrication may not be provided during forming processes. If the content of the lubricant is greater than 5 wt %, corrosion resistance may deteriorate because of excessively large amounts of substances such as a dispersant, and recoating characteristics deteriorate because of the releasing property of the lubricant.

Another embodiment of the present disclosure may provide a surface-treated steel sheet having high blackening resistance and corrosion resistance, the surface-treated steel sheet including a magnesium-containing steel sheet and a coating layer formed on at least one side of the magnesium-containing steel sheet, wherein the coating layer is a cured product of the above-described chromium-free coating composition.

Preferably, the coating layer may have a dry weight of 300 mg/m$^2$ to 1200 mg/m$^2$. If this coating weight is lower than 300 mg/m$^2$, sufficient corrosion resistance and other physical characteristics may not be guaranteed, and if the coating weight is greater than 1200 mg/m$^2$, conductivity and economical efficiency may decrease.

Preferably, the chromium-free coating composition may be cured at a temperature of 70° C. to 180° C. If the curing temperature is lower than 70° C., blocking may occur in a coating line because the chromium-free coating composition is not fully dried and cured, and the alkali resistance of the chromium-free coating composition may decrease. Conversely, if the curing third is greater than 180° C., economical efficiency may decrease because of excessive use of energy.

MODE FOR INVENTION

Hereinafter, the embodiments of the present disclosure will be described more specifically through examples. However, the examples are for specifically explaining the embodiments of the present disclosure and are not intended to limit the scope of the present invention.

Synthesis Example 1) Preparation of Waterborne Polyurethane

A 2-liter flask, an agitator, a heating mantle, a condenser, and a thermometer were prepared, and after filling the 2-liter flask with 240 g of isophorone diisocyanate (IPDI), 350 g of polycarbonate diol (molecular weight: 500), and 110 g of N-methylpyrrolidone (NMP) solvent, the 2-liter flask was filled with nitrogen and maintained at 95° C. for 2 hours to cause the substances to react with each other. Then, after cooling the flask to 90° C., 35 g of dimethylol propionic acid (DMPA), 15 g of trimethylol propane (TMP), and 1 g of dibutyltin dilaurate (DBTDL) diluted with xylene to a concentration of 10% were filled in the reactor. Thereafter, a reaction temperature was maintained until an NCO value of 5 or less was measured, and then a prepolymer obtained as a result of the reaction was cooled to 80° C. and neutralized with tertiary amine: triethylamine (TEA).

Another 3-liter flask was prepared and filled with 1,050 g of distilled water. Then, the 3-liter flask was heated to 30° C. and maintained at the temperature, while pouring the prepared prepolymer into the 3-liter flask filled with distilled water, the 3-liter flask was vigorously agitated. The 3-liter flask was agitated for 30 minutes after the prepolymer was poured into the 3-liter flask, and then 70 g of 30% hydrazine hydrate was uniformly dripped into the 3-liter flask for 10 minutes. Thereafter, reaction in the 3-liter flask was maintained at 50° C. for 2 hours, and then homogeneous waterborne polyurethane having a solids content of about 34% was obtained.

Synthesis Example 2) Preparation of Waterborne Silane-Modified Polyurethane

After preparing waterborne polyurethane as described in Synthesis Example 1, 20 g of KBM-603 (an aminosilane-based product by the ShinEtsu Company of Japan) and 50 g of 30% hydrazine hydrate were uniformly dripped into the waterborne polyurethane, respectively, for 10 minutes. Thereafter, reaction was maintained at 50° C. for 2 hours, and then homogeneous waterborne silane-modified polyurethane having a solids content of about 34% was obtained.

Synthesis Examples 3 to 8) Preparation of Waterborne Silane-Modified Polyurethanes Waterborne silane-modified polyurethanes were prepared using chain extenders as shown in Table 1 below using the same equipment and processes as those used in Synthesis Example 1.

TABLE 1

| No. (wt %) | Hydrazine Hydrate (30%) | KBM-603 | KBM-603 | KBE-602 | KBE-602 |
|---|---|---|---|---|---|
| Synthesis Example 1 | 70 | 0 | 0 | 0 | 0 |
| Synthesis Example 2 | 50 | 20 | 0 | 0 | 0 |
| Synthesis Example 3 | 30 | 40 | 0 | 0 | 0 |
| Synthesis Example 4 | 10 | 60 | 0 | 0 | 0 |
| Synthesis Example 5 | 0 | 70 | 0 | 0 | 0 |
| Synthesis Example 6 | 0 | 0 | 70 | 0 | 0 |
| Synthesis Example 7 | 0 | 0 | 0 | 70 | 0 |
| Synthesis Example 8 | 0 | 0 | 0 | 0 | 70 |

Coating compositions were prepared by adding a hardener (S-501 manufactured by the Chisso Company of Japan), a blackening inhibitor (ammonium molybdate tetrahydrate manufactured by the Sigma-Aldrich Company of the USA), a corrosion inhibitor (lithium polysilicate manufactured by the Grace Company of the USA), a lubricant (W-500 manufactured by the Mitsui Chemical Company of Japan), and purified water to the prepared waterborne silane-modified polyurethanes in amounts shown in Table 2.

TABLE 2

| No. (wt %) | Inventive Example 1 | Inventive Example 2 | Inventive Example 3 | Inventive Example 4 | Inventive Example 5 | Inventive Example 6 | Inventive Example 7 | Comparative Example 1 |
|---|---|---|---|---|---|---|---|---|
| Synthesis Example 1 | 0 | 0 | 0 | 0 | 0 | 0 | 0 | 55 |
| Synthesis Example 2 | 55 | 0 | 0 | 0 | 0 | 0 | 0 | 0 |
| Synthesis Example 3 | 0 | 55 | 0 | 0 | 0 | 0 | 0 | 0 |
| Synthesis Example 4 | 0 | 0 | 55 | 0 | 0 | 0 | 0 | 0 |
| Synthesis Example 5 | 0 | 0 | 0 | 55 | 0 | 0 | 0 | 0 |
| Synthesis Example 6 | 0 | 0 | 0 | 0 | 55 | 0 | 0 | 0 |
| Synthesis Example 7 | 0 | 0 | 0 | 0 | 0 | 55 | 0 | 0 |
| Synthesis Example 8 | 0 | 0 | 0 | 0 | 0 | 0 | 55 | 0 |
| Hardener | 2 | 2 | 2 | 2 | 2 | 2 | 2 | 2 |
| Blackening Inhibitor | 2 | 2 | 2 | 2 | 2 | 2 | 2 | 2 |
| Corrosion Resistance | 3 | 3 | 3 | 3 | 3 | 3 | 3 | 3 |
| Slip Lubricant | 1 | 1 | 1 | 1 | 1 | 1 | 1 | 1 |
| Purified Water | 37 | 37 | 37 | 37 | 37 | 37 | 37 | 37 |

Magnesium-containing steel sheets were coated with coating compositions of Inventive Examples 1 to 7 and Comparative Examples 1 by using a bar coater and were dried at a PMT of 150° C., so as to form coating layers on the magnesium-containing steel sheets. The coating compositions were applied at a coating weight of 1,000 mg/m$^2$. Thereafter, the properties of the dried coating layers of Inventive Examples 1 to 7 and Comparative Example 1 were evaluated under the conditions described below, and results of the evaluation are shown in Table 3.

<Flat Sheet Corrosion Resistance Test>

Flat sheet corrosion resistance was evaluated by checking the occurrence of white rust on the surface-treated steel sheets with respect to time by a method stated in ASTM B117.

⊚: No white rust
◯: 5% or less white rust
X: 5% or more white rust

<Alkali Resistance Test>

Prepared samples were submerged for 2 minutes in 20 g/L of a strong alkaline degreasing agent (FC-4460 manufactured by the Parkerizing Company of Japan) having a temperature of 40° C. to 45° C., and then the samples were washed with running water and dried. Thereafter, external discoloration or separation of coating layers were evaluated.

⊚: No discoloration, No separation
◯: Discoloration occurred with a color difference of 1 or less, No separation
X: Separation <Blackening Resistance Test>

Samples were maintained in a thermo-hygrostat for 120 hours at a temperature of 50° C. and a relative humidity (RH) of 95% under a pressure of 10 kgf/cm² to 20 kgf/cm² for 120 hours. Color differences ΔE of the samples before and after the test were measured and evaluated according to the following references.

⊚: ΔE<2
◯: 2≤ΔE<3
X: ΔE≥3

<Solvent Resistance Test>

Pieces of gauze sufficiently dampened with 98% or more ethanol and acetone were prepared, and each sample was rubbed back and forth 5 times with a piece of the gauze. Then, the appearance of samples was evaluated.

⊚: No change in appearance
◯: Separation occurred after three or more reciprocations
X: Separation occurred before three reciprocations <Coatability Test>

Acrylic melamine-based baking-type paint was sprayed onto samples and was dried to form coating layers having a thickness of 30 μm on the samples. Thereafter, fine slits were formed in each of the coating layers with a knife to form 100 squares at intervals of 1 mm. The adhesion of the squares was evaluated using cellophane tape.

⊚: No square was separated
◯: One square was partially separated
X: One or more squares were separated <Fingerprint Resistance Test>

Evaluation was performed by measuring color difference values Δ1 hour after applying petroleum jelly to prepared samples.

⊚: ΔL<1
◯: 1≤ΔE<2
X: ΔE≥2

TABLE 3

| No. | Corrosion Resistance | Alkali Resistance | Blackening Resistance | Solvent Resistance | Coatability | Fingerprint Resistance |
|---|---|---|---|---|---|---|
| Inventive Example 1 | ⊚ | ◯ | ⊚ | ◯ | ⊚ | ⊚ |
| Inventive Example 2 | ⊚ | ⊚ | ⊚ | ⊚ | ⊚ | ⊚ |
| Inventive Example 3 | ⊚ | ⊚ | ⊚ | ⊚ | ⊚ | ⊚ |
| Inventive Example 4 | ⊚ | ⊚ | ⊚ | ⊚ | ⊚ | ⊚ |
| Inventive Example 5 | ⊚ | ⊚ | ⊚ | ⊚ | ⊚ | ⊚ |
| Inventive Example 6 | ⊚ | ⊚ | ⊚ | ⊚ | ⊚ | ⊚ |
| Inventive Example 7 | ⊚ | ⊚ | ⊚ | ⊚ | ⊚ | ⊚ |
| Comparative Example 1 | X | X | X | X | ◯ | ⊚ |

Corrosion resistance, alkali resistance, blackening resistance, and solvent resistance were satisfactory in all Inventive Examples 1 to 7, as compared to Comparative Example 1 in which silane modification was not induced.

Coating compositions were prepared by adding a hardener, a blackening inhibitor, a corrosion inhibitor, a lubricant, and purified water to the waterborne silane-modified polyurethane of Synthesis Example 5 used in Inventive Example 4 in amounts shown in Table 4 below. Thereafter, properties of dried coating layers formed of the coating compositions of Inventive Examples 8 to 19 and Comparative Examples 2 to 9 were evaluated, and results of the evaluation are shown in Table 4.

TABLE 4

| No. (wt %) | Synthesis Example 5 | Hardener | Blackening Inhibitor | Corrosion Inhibitor | Lubricant | Purified water | Corrosion Resistance | Alkali Resistance | Blackening Resistance | Solvent Resistance | Coatability | Fingerprint Resistance |
|---|---|---|---|---|---|---|---|---|---|---|---|---|
| Inventive Example 8 | 55 | 0.5 | 2 | 3 | 1 | 38.5 | ◯ | ⊚ | ⊚ | ◯ | ⊚ | ⊚ |
| Inventive Example 9 | 55 | 5 | 2 | 3 | 1 | 34 | ⊚ | ⊚ | ⊚ | ◯ | ⊚ | ⊚ |
| Inventive Example 10 | 55 | 2 | 0.5 | 3 | 1 | 38.5 | ⊚ | ⊚ | ⊚ | ⊚ | ⊚ | ⊚ |

TABLE 4-continued

| No. (wt %) | Synthesis Example 5 | Hardener | Blackening Inhibitor | Corrosion Inhibitor | Lubricant | Purified water | Corrosion Resistance | Alkali Resistance | Blackening Resistance | Solvent Resistance | Coatability | Fingerprint Resistance |
|---|---|---|---|---|---|---|---|---|---|---|---|---|
| Inventive Example 11 | 55 | 2 | 5 | 3 | 1 | 34 | ○ | ◎ | ◎ | ◎ | ◎ | ◎ |
| Inventive Example 12 | 55 | 2 | 2 | 1 | 1 | 39 | ◎ | ◎ | ◎ | ○ | ◎ | ◎ |
| Inventive Example 13 | 55 | 2 | 2 | 5 | 1 | 35 | ◎ | ◎ | ◎ | ○ | ◎ | ◎ |
| Inventive Example 14 | 55 | 0.5 | 0.5 | 3 | 1 | 40 | ◎ | ◎ | ◎ | ◎ | ◎ | ◎ |
| Inventive Example 15 | 55 | 5 | 5 | 3 | 1 | 31 | ○ | ◎ | ◎ | ○ | ◎ | ◎ |
| Inventive Example 16 | 55 | 0.5 | 0.5 | 1 | 1 | 42 | ◎ | ◎ | ◎ | ○ | ◎ | ◎ |
| Inventive Example 17 | 55 | 0.5 | 0.5 | 5 | 1 | 38 | ◎ | ◎ | ◎ | ◎ | ◎ | ◎ |
| Inventive Example 18 | 55 | 5 | 5 | 1 | 1 | 33 | ◎ | ◎ | ◎ | ○ | ◎ | ◎ |
| Inventive Example 19 | 55 | 5 | 5 | 5 | 1 | 29 | ◎ | ◎ | ◎ | ◎ | ◎ | ◎ |
| Comparative Example 2 | 55 | 0 | 2 | 3 | 1 | 39 | X | X | ◎ | X | ○ | ◎ |
| Comparative Example 3 | 55 | 2 | 0 | 3 | 1 | 39 | X | X | X | ◎ | ◎ | ◎ |
| Comparative Example 4 | 55 | 2 | 2 | 0 | 1 | 40 | X | ◎ | ◎ | ◎ | ◎ | ◎ |
| Comparative Example 5 | 55 | 2 | 2 | 3 | 0 | 38 | ○ | ◎ | X | ◎ | ◎ | ◎ |
| Comparative Example 6 | 55 | 7 | 2 | 3 | 1 | 32 | X | X | ◎ | X | ◎ | ◎ |
| Comparative Example 7 | 55 | 2 | 7 | 3 | 1 | 32 | X | X | ◎ | ◎ | ◎ | ◎ |
| Comparative Example 8 | 55 | 2 | 2 | 10 | 1 | 30 | X | X | X | X | X | X |
| Comparative Example 9 | 55 | 2 | 2 | 3 | 5 | 33 | ○ | ◎ | ◎ | ◎ | X | ◎ |

Referring to Table 4 above, corrosion resistance, alkali resistance, blackening resistance, solvent resistance, coatability, and fingerprint resistance were satisfactory in Inventive Examples 8 to 19 compared to in Comparative Examples 2 to 9.

The invention claimed is:

1. A chromium-free coating composition for a magnesium-containing steel sheet having high blackening resistance and corrosion resistance, the chromium-free coating composition comprising a waterborne silane-modified polyurethane in an amount of 20 wt % to 70 wt %, a hardener in an amount of 0.5 wt % to 5 wt %, a blackening inhibitor in an amount of 0.5 wt % to 5 wt %, a corrosion inhibitor in an amount of 0.5 wt % to 5 wt %, a lubricant in an amount of 0.5 wt % to 5 wt %, and a balance of a solvent,
wherein the blackening inhibitor comprises a molybdenum-based compound, and the waterborne silane-modified polyurethane has a number average molecular weight within a range of 10,000 to 60,000.

2. The chromium-free coating composition for a magnesium-containing steel sheet of claim 1, wherein the waterborne silane-modified polyurethane comprises organosilane in an amount of 1 wt % to 5 wt % based on a total weight of the waterborne silane-modified polyurethane.

3. The chromium-free coating composition for a magnesium-containing steel sheet of claim 2, wherein the organosilane is a compound having the following chemical formula:

where x is an integer ranging from 1 to 2, and y and z are integers ranging from 1 to 3.

4. The chromium-free coating composition for a magnesium-containing steel sheet of claim 2, wherein the organosilane comprises at least one selected from the group consisting of N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, and N-(2-aminoethyl)-3-aminopropyltripropoxysilane.

5. The chromium-free coating composition for a magnesium-containing steel sheet of claim 1, wherein the hardener comprises at least one selected from the group consisting of 3-glycidoxypropyltrimethoxysilane, 3-glycidoxypropyltriethoxysilane, 3-glycidoxypropyltriethoxysilane, 3-glycidoxypropyltripropylsilane, 3-glycidoxypropyltriisopropylsilane, 2-(3, 4-epoxycyclohexyl)ethyltrimethoxysilane, and 2-(3,4-epoxycyclohexyl)ethyltriethoxysilane.

6. The chromium-free coating composition for a magnesium-containing steel sheet of claim 1, wherein the corrosion inhibitor comprises at least one selected from the group consisting of lithium silicate, sodium silicate, and potassium silicate.

7. The chromium-free coating composition for a magnesium-containing steel sheet of claim 1, wherein the corrosion inhibitor has a metal content of 0.1 wt % to 2 wt % based on a total weight of the corrosion inhibitor.

8. A surface-treated steel sheet having high blackening resistance and corrosion resistance, the surface-treated steel sheet comprising:

a magnesium-containing steel sheet; and
a coating layer formed on at least one side of the magnesium-containing steel sheet,
wherein the coating layer is a cured product of the chromium-free coating composition of claim 1.

9. The surface-treated steel sheet of claim 8, wherein the coating layer has a dry weight of 300 mg/m² to 1200 mg/m².

10. The surface-treated steel sheet of claim 8, wherein the chromium-free coating composition is cured at a temperature of 70° C. to 180° C.

\* \* \* \* \*